(12) United States Patent
Yang et al.

(10) Patent No.: US 10,938,015 B2
(45) Date of Patent: Mar. 2, 2021

(54) HIGH CAPACITY SECONDARY BATTERY

(71) Applicant: SAMSUNG ELECTRONICS CO., LTD., Suwon-si (KR)

(72) Inventors: Hojung Yang, Suwon-si (KR); Kyounghwan Kim, Seoul (KR); Hwiyeol Park, Ansan-si (KR); Sungjin Lim, Suwon-si (KR); Huisu Jeong, Suwon-si (KR); Jin S. Heo, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 50 days.

(21) Appl. No.: 15/711,429

(22) Filed: Sep. 21, 2017

(65) Prior Publication Data

US 2018/0130993 A1    May 10, 2018

(30) Foreign Application Priority Data

Nov. 7, 2016    (KR) .................. 10-2016-0147629

(51) Int. Cl.

| | |
|---|---|
| *H01M 10/04* | (2006.01) |
| *H01M 2/24* | (2006.01) |
| *H01M 10/0562* | (2010.01) |
| *H01M 10/058* | (2010.01) |
| *H01M 2/04* | (2006.01) |
| *H01M 10/052* | (2010.01) |

(52) U.S. Cl.
CPC .......... *H01M 2/24* (2013.01); *H01M 2/0417* (2013.01); *H01M 10/0454* (2013.01); *H01M 10/0481* (2013.01); *H01M 10/052* (2013.01); *H01M 10/058* (2013.01); *H01M 10/0562* (2013.01); *H01M 2300/0068* (2013.01)

(58) Field of Classification Search
CPC .. H01M 2/24; H01M 10/058; H01M 10/0562; H01M 10/0454; H01M 10/0481; H01M 2/0417; H01M 10/052; H01M 2300/0068
See application file for complete search history.

(56) References Cited

U.S. PATENT DOCUMENTS

| | | | |
|---|---|---|---|
| 6,045,952 A * | 4/2000 | Kerr .................. | H01M 10/4235 429/307 |
| 8,999,571 B2 | 4/2015 | Chiang et al. | |
| 2008/0241685 A1* | 10/2008 | Hinoki .................... | H01M 4/13 429/209 |

(Continued)

FOREIGN PATENT DOCUMENTS

| | | |
|---|---|---|
| JP | 2010108751 A | 5/2010 |
| KR | 1020150104080 A | 9/2015 |

(Continued)

*Primary Examiner* — Cynthia K Walls
(74) *Attorney, Agent, or Firm* — Cantor Colburn LLP

(57) ABSTRACT

A plurality of unit cells is stacked on each other in a secondary battery, and each of the plurality of unit cells includes first and second collector layers, which are spaced apart from each other, and a 3-dimensional ("3D") electrode structure provided between the first and second collector layers and having an outer side surface that is externally exposed and insulated, wherein, in the plurality of unit cells, the first collector layers are stacked to face each other and the second collector layers are stacked to face each other.

23 Claims, 16 Drawing Sheets

(56) References Cited

U.S. PATENT DOCUMENTS

| | | | |
|---|---|---|---|
| 2011/0129722 A1* | 6/2011 | Yoneda | H01M 4/661 |
| | | | 429/162 |
| 2016/0204464 A1 | 7/2016 | Cho et al. | |

FOREIGN PATENT DOCUMENTS

| | | |
|---|---|---|
| KR | 1020150002857 A | 7/2016 |
| KR | 1020150007444 A | 7/2016 |
| WO | 03028142 A1 | 4/2003 |

* cited by examiner

HIGH CAPACITY SECONDARY BATTERY

CROSS-REFERENCE TO RELATED APPLICATION

This application claims priority to Korean Patent Application No. 10-2016-0147629, filed on Nov. 7, 2016, and all the benefits accruing therefrom under 35 U.S.C. § 119, the content of which in its entirety is herein incorporated by reference.

BACKGROUND

1. Field

Embodiments of the disclosure relate to a secondary battery, and more particularly, to a high-capacity secondary battery having high energy density.

2. Description of the Related Art

Unlike a primary battery that is incapable of being charged, a secondary battery is capable of being charged and discharged, and is widely used in high-tech electronic device fields, such as a cellular phone, a laptop computer, and a camcorder.

In particular, demand for a lithium secondary battery is increasing because the lithium secondary battery has a higher voltage than that of a nickel-cadmium battery or a nickel-hydrogen battery that is most widely used as a power source of portable electronic devices, and has high energy density per unit weight. A lithium-based oxide is mainly used as a positive electrode active material of the lithium secondary battery, and a carbon material is mainly used as a negative electrode active material of the lithium secondary battery. Recently, a high-capacity secondary battery using a 3-dimensional ("3D") structured electrode, which may realize high energy density, has been developed.

SUMMARY

Provided is a high-capacity secondary battery having high energy density.

Additional embodiments will be set forth in part in the description which follows and, in part, will be apparent from the description, or may be learned by practice of the presented embodiments.

According to an embodiment, a secondary battery in which a plurality of unit cells is stacked on each other, wherein each of the plurality of unit cells includes first and second collector layers, which are spaced apart from each other, and a 3-dimensional ("3D") electrode structure provided between the first and second collector layers and including an outer side surface that is externally exposed and insulated, wherein, in the plurality of unit cells, the first collector layers are stacked to face each other and the second collector layers are stacked to face each other.

In an embodiment, the 3D electrode structure may include a plurality of first active material layers extending perpendicularly on a first collector layer of the first collector layers, a solid electrolyte film provided on the plurality of first active material layers and including an insulating material, and a second active material layer provided on the solid electrolyte film and exposing an outer side surface of the solid electrolyte film.

In an embodiment, the 3D electrode structure may include a plurality of first active material layers extending perpendicularly on the first collector layer, a solid electrolyte film provided on the plurality of first active material layers, a second active material layer provided on the solid electrolyte film, and an insulating layer provided on an outer side surface of the second active material layer.

In an embodiment, a second collector layer of the second collector layers may have a size equal to or smaller than that of the 3D electrode structure. The first collector layer may have a size equal to or larger than that of the 3D electrode structure.

In an embodiment, each of the plurality of unit cells may further include a first lead wire extending from the first collector layer, and a second lead wire extending from the second collector layer. A first insulating member may be provided at a portion of the first lead wire, which is connected to the first collector layer, and a second insulating member may be provided at a portion of the second lead wire, which is connected to the second collector layer.

In an embodiment, the secondary battery may further include at least one binding member winding the plurality of unit cells that are stacked on each other to fix and support the plurality of unit cells.

In an embodiment, the first collector layers of adjacent unit cells, which face each other, may be unitary, and the second collector layers of the adjacent unit cells, which face each other, may be unitary. The second collector layer may include a metal foil attached to the 3D electrode structure.

According to another embodiment of an embodiment, a secondary battery in which a plurality of unit cells are stacked on each other, wherein each of the plurality of unit cells includes first and second collector layers, which are spaced apart from each other, and a 3D electrode structure provided between the first and second collector layers, wherein the second collector layer has a size smaller than that of the 3D electrode structure, and in the plurality of unit cells, the first collector layers are stacked to face each other and the second collector layers are stacked to face each other.

In an embodiment, the first collector layer may have a size equal to or larger than that of the 3D electrode structure.

In an embodiment, the 3D electrode structure may be provided such that an outer side surface that is externally exposed is insulated.

In an embodiment, the 3D electrode structure may include a plurality of first active material layers extending perpendicularly on the first collector layer, a solid electrolyte film provided on the plurality of first active material layers and including an insulating material, and a second active material layer provided on the solid electrolyte film and exposing an outer surface of the solid electrolyte film.

In an embodiment, the 3D electrode structure may include a plurality of first active material layers extending perpendicularly on the first collector layer, a solid electrolyte film provided on the plurality of first active material layers, a second active material layer provided on the solid electrolyte film, and an insulating layer provided on a side outer surface of the second active material layer.

In an embodiment, each of the plurality of unit cells may further include a first lead wire extending from the first collector layer, and a second lead wire extending from the second collector layer. A first insulating member may be provided at a portion of the first lead wire, which is connected to the first collector layer, and a second insulating member may be provided at a portion of the second lead wire, which is connected to the second collector layer.

In an embodiment, the secondary battery may further include at least one binding member winding around the plurality of unit cells that are stacked on each other to fix and support the plurality of unit cells.

In an embodiment, the first collector layers of adjacent unit cells, which face each other, may be unitary, and the second collector layers of the adjacent unit cells, which face each other, may be unitary. The second collector layer may include a metal foil attached to the 3D electrode structure.

According to another embodiment of another embodiment, a unit cell of a secondary battery, the unit cell includes first and second collector layers, which are spaced apart from each other, and a 3D electrode structure provided between the first and second collector layers and including an outer side surface that is externally exposed and insulated.

BRIEF DESCRIPTION OF THE DRAWINGS

These and/or other embodiments, features and advantages will become apparent and more readily appreciated from the following description of the embodiments, taken in conjunction with the accompanying drawings, in which.

DETAILED DESCRIPTION

Figure 1:
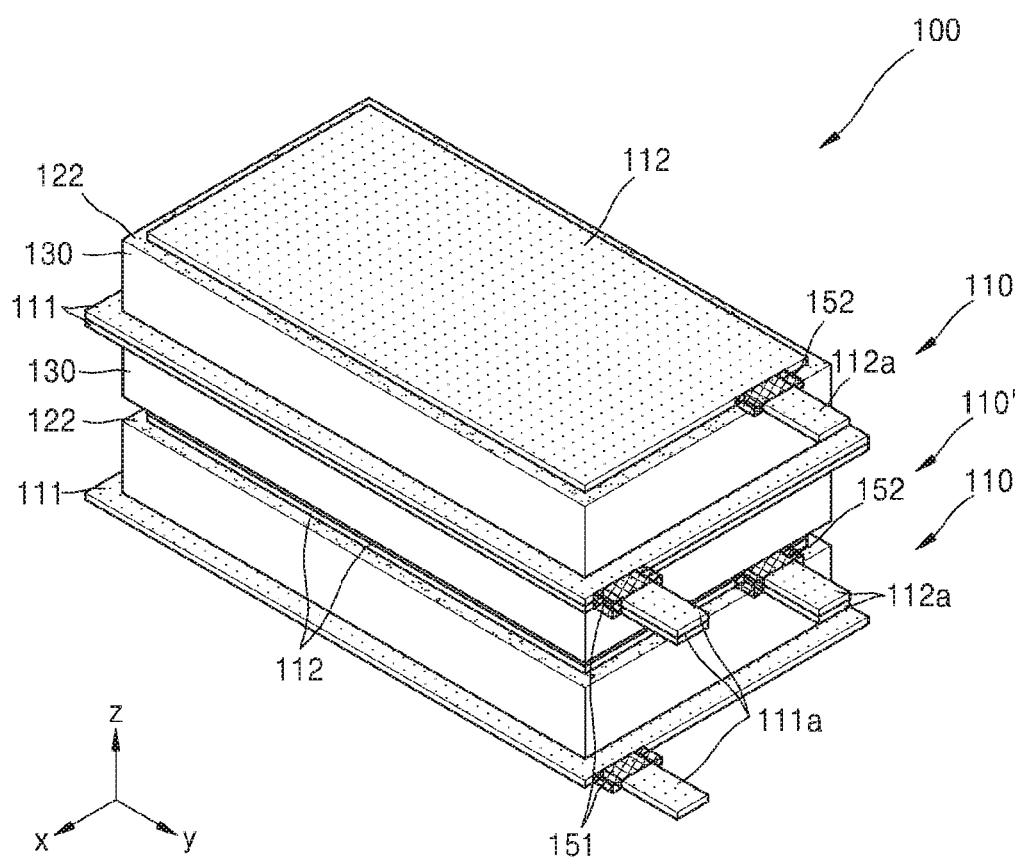
FIG. 1 is a perspective view of an embodiment of a secondary battery.

Reference will now be made in detail to embodiments, examples of which are illustrated in the accompanying drawings, wherein like reference numerals refer to like elements throughout and sizes or thicknesses of elements may be exaggerated for clarity. In this regard, the embodiments may have different forms and should not be construed as being limited to the descriptions set forth herein. Accordingly, the embodiments are merely described below, by referring to the drawing figures, to explain embodiments.

When a certain material layer is provided on a substrate or another layer, the certain material layer may be provided directly on the substrate or the other layer, or a third layer may exist therebetween. Also, a material forming each layer according to one or more embodiments is only an example, and thus another material may alternatively be used.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 2:
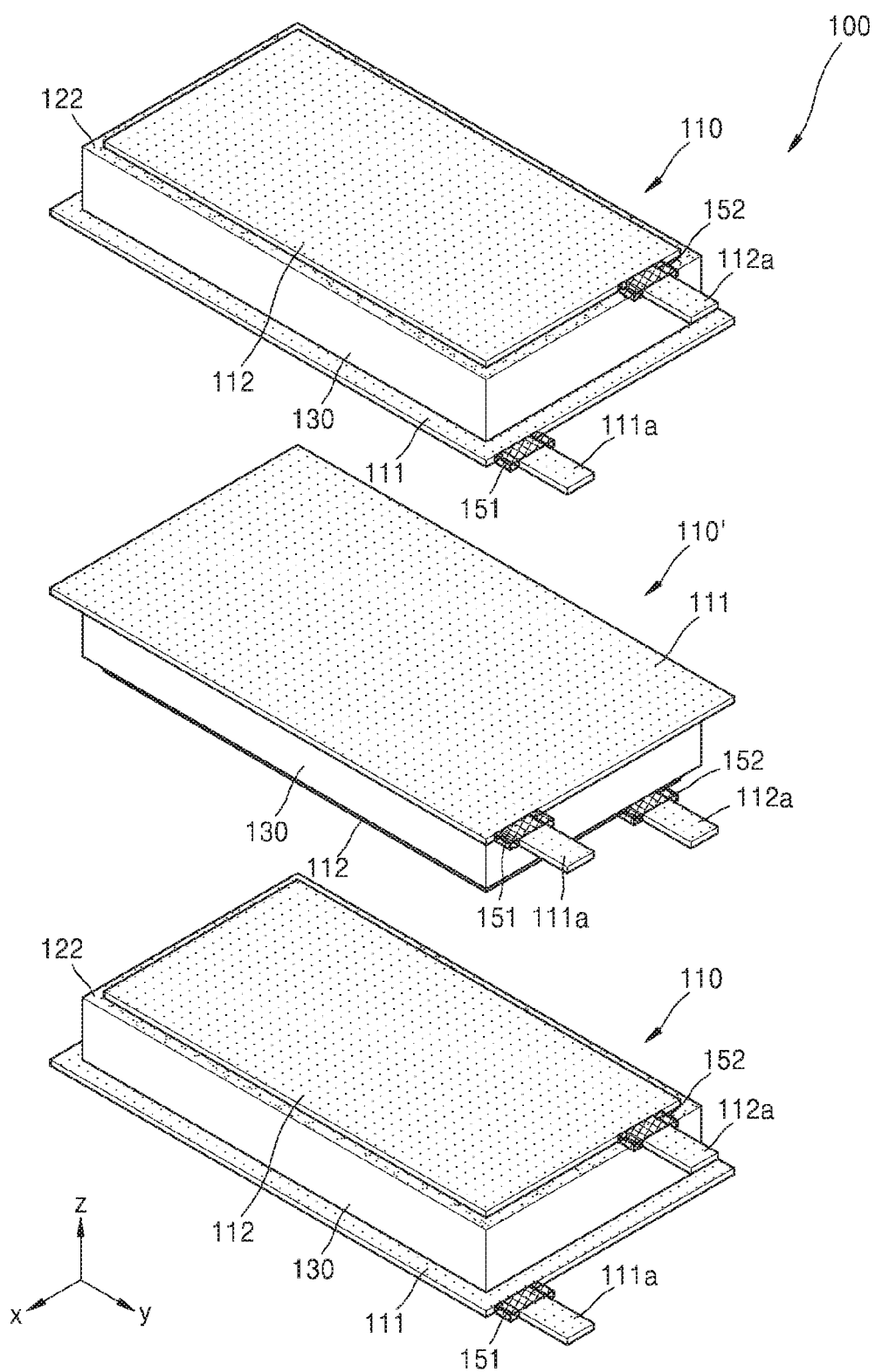
FIG. 2 is an exploded perspective view of the secondary battery of FIG. 1.

FIG. 1 is a perspective view of a secondary battery 100 according to an embodiment, and FIG. 2 is an exploded perspective view of the secondary battery 100 of FIG. 1.

Referring to FIGS. 1 and 2, the secondary battery 100 includes a plurality of unit cells 110 and 110' that are stacked on each other in a perpendicular direction (in a z-direction in FIGS. 1 and 2. Here, each of the unit cells 110 and 110' includes first and second collector layers 111 and 112, and a 3-dimensional electrode structure provided between the first and second collector layers 111 and 112. Although in FIGS. 1 and 2 the secondary battery 100 includes three unit cells 110 and 110', the invention is not limited thereto, and in an alternative embodiment, the second battery 100 may include two or at least four unit cells.

Figure 3:
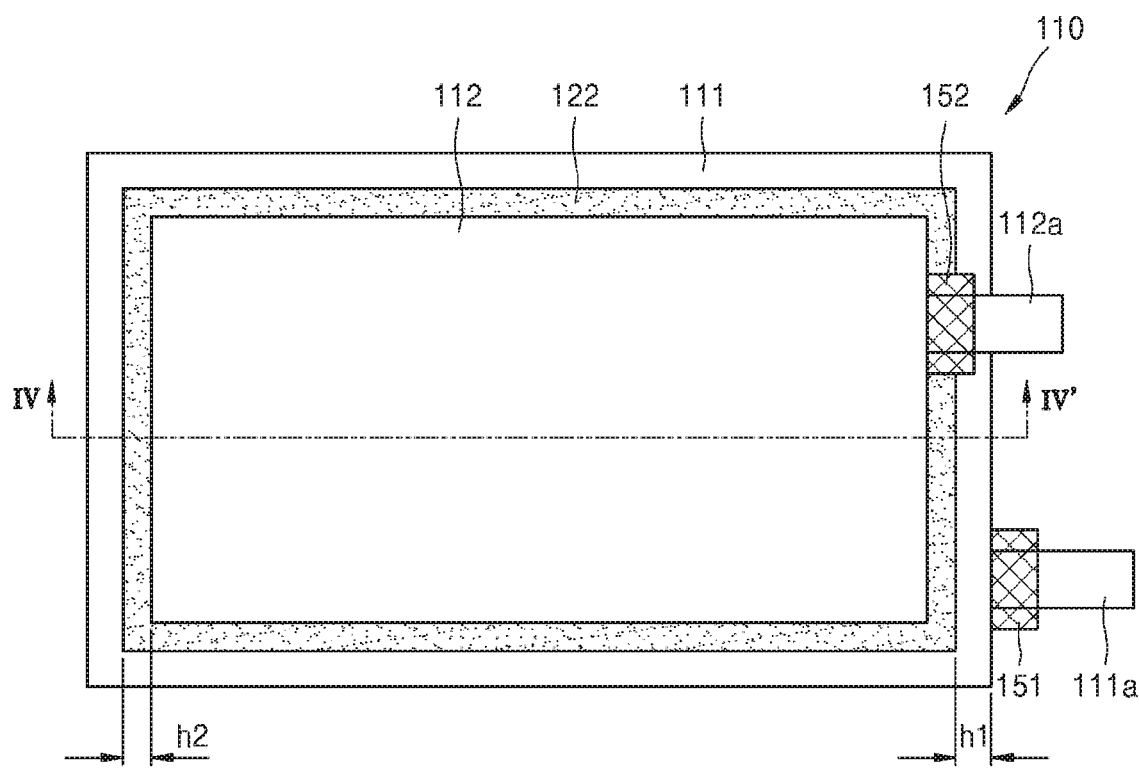
FIG. 3 is a plan view of an embodiment of a unit cell of the secondary battery of FIG. 2.
Figure 4:
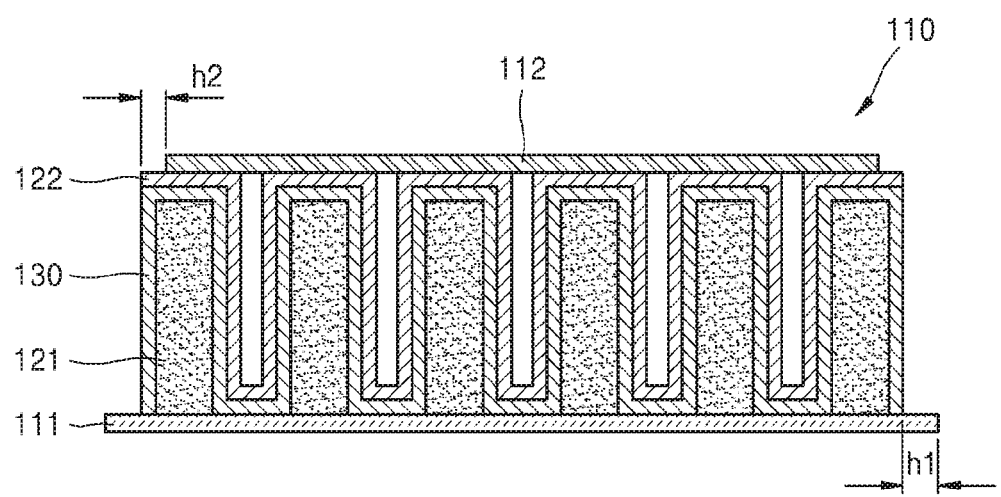
FIG. 4 is a cross-sectional view taken along line IV-IV' of FIG. 3.

FIG. 3 is a plan view of the unit cell 110 of the secondary battery 100 of FIG. 2, according to an embodiment, and FIG. 4 is a cross-sectional view taken along line IV-IV' of FIG. 3.

Referring to FIGS. 3 and 4, the unit cell 110 of the secondary battery 100 may include the first collector layer 111, the 3D electrode structure provided on the first collector layer 111, and the second collector layer 112 provided on the 3D electrode structure.

The first collector layer 111 may be, for example, a positive electrode collector layer. In an embodiment, the first collector layer 111 may include a collector material, such as aluminum (Al) or nickel (Ni), but is not limited thereto.

The 3D electrode structure may include a plurality of first active material layers 121 provided perpendicularly on a top surface of the first collector layer 111, a solid electrolyte film 130 provided on the first active material layer 121, and a second active material layer 122 provided on the solid electrolyte film 130. Here, each of the first active material layers 121 may include a 3D structure having a high aspect ratio. Here, the aspect ratio denotes a ratio of a height, e.g., measured in a vertical direction in FIG. 4, to a width, e.g., measured in a horizontal direction in FIG. 4, of the 3D structure (that is height:width=height/width). In an embodiment, each of the first active material layers 121 may have, for example, an aspect ratio of at least 1:1. The first active material layer 121 may be a positive electrode active material layer. In an embodiment, the first active material layer 121 may include, for example, $LiMO_2$, wherein M is cobalt (Co), Ni, manganese (Mn), or a combination of at least two thereof, but is not limited thereto.

The solid electrolyte film 130 may be provided to cover a surface of the plurality of first active material layers 121. Also, the solid electrolyte film 130 may be provided to cover a top surface of the first collector layer 111 between the first active material layers 121. In an embodiment, the solid electrolyte film 130 may include an insulating material, for example, Li-based insulating material. In an embodiment, the solid electrolyte film 130 may include lithium phosphorous oxynitride (LiPON) or lithium silicophosphate (LiSiPON), for example, but is not limited thereto.

The second active material layer 122 may be provided to cover a surface of the solid electrolyte film 130 except for an outer side surface of the solid electrolyte film 130. The second active material layer 122 may be a negative electrode active material layer. In an embodiment, the second active material layer 122 may include, for example, Li, but is not limited thereto. The outer side surface of the solid electrolyte film 130 may be externally exposed by the second active material layer 122. As such, since the outer side surface of the solid electrolyte film 130 including an insulating material is externally exposed, an outer side surface of the 3D electrode structure may be insulated.

The second collector layer 112 may be provided on a top surface of the second active material layer 122. The second collector layer 112 may be provided by attaching a metal foil on the top surface of the second active material layer 122. In an embodiment, the metal foil may have a thickness from about 3 micrometers (μm) to about 10 μm, for example, but is not limited thereto. The second collector layer 112 may be a negative collector layer. In an embodiment, the second collector layer 112 may include Cu, for example, but is not limited thereto.

The first collector layer 111 may have a size equal to or larger than that of the 3D electrode structure. When the first collector layer 111 has a size larger than that of the 3D electrode structure, the first collector layer 111 may protrude further than the 3D electrode structure. In FIGS. 3 and 4, the first collector layer 111 has a size larger than that of the 3D electrode structure, and thus protrudes further than the 3D electrode structure. In an embodiment, a protruding size h1 of the first collector layer 111 may be from about 500 μm to about 3 mm, for example, but is not limited thereto.

The second collector layer 112 may have a size equal to or smaller than that of the 3D electrode structure. When the second collector layer 112 has a size smaller than that of the 3D electrode structure, the second collector layer 112 may be provided at an inner side of the 3D electrode structure. In FIGS. 3 and 4, the second collector layer 112 having a size smaller than that of the 3D electrode structure is provided at the inner side of the 3D electrode structure. In an embodiment, a size difference h2 between the second collector layer 112 and the 3D electrode structure may be about 10 μm or less, for example, but is not limited thereto.

The unit cell 110 of the secondary battery 100 may include a first lead wire 111a extending from the first collector layer 111 and a second lead wire 112a extending from the second collector layer 112. The first and second lead wires 111a and 112a may include the same materials respectively as that of the first and second collector layers 111 and 112. However, in an alternative embodiment, the first and second lead wires 111a and 112a may include other materials.

A first insulating member 151 may be provided at a portion of the first lead wire 111a, which is connected to the first collector layer 111, and a second insulating member 152 may be provided at a portion of the second lead wire 112a, which is connected to the second collector layer 112. In an embodiment, the first and second insulating members 151 and 152 may have a length of about 1 millimeter (mm) to about 1 centimeter (cm) respectively along length directions of the first and second lead wires 111a and 112a, for example. In an embodiment, the first and second insulating members 151 and 152 may have a length of about 1 mm to about 4 mm respectively along the length directions of the first and second lead wires 111a and 112a, for example, but are not limited thereto. In an embodiment, the first and second insulating members 151 and 152 may be, for example, a deposition layer or adhesive tape, but are not limited thereto.

Referring back to FIGS. 1 and 2, the plurality of unit cells 110 and 110' may be perpendicularly stacked on each other to manufacture the secondary battery 100 having high capacity. In the secondary battery 100 according to the current embodiment, the adjacent unit cells 110 and 110' may be stacked symmetrically. In other words, the adjacent unit cells 110 and 110' may be stacked on each other such that the first and second collector layers 111 and 112 having the same polarities may be stacked to face each other. In FIGS. 1 and 2, the unit cell 110' is obtained by turning over the unit cell 110. Accordingly, in the adjacent unit cells 110 and 110' that are stacked on each other, the first collector layers 111 face and contact each other, and the second collector layers 112 face and contact each other.

As described above, the first collector layer 111 may have a size equal to or larger than that of the 3D electrode structure. When the first collector layer 111 has a size larger than that of the 3D electrode structure, the first collector layer 111 may protrude and be exposed outside the secondary battery 100, as shown in FIG. 1.

Also, the second collector layer 112 may have a size equal to or smaller than that of the 3D electrode structure. When the second collector layer 112 has a size smaller than that of the 3D electrode structure, the second collector layer 112 may be provided at an inner side of the secondary battery 100, as shown in FIG. 1, and thus may not be exposed outside the secondary battery 100.

According to the current embodiment, the high-capacity secondary battery 100 having improved energy density and improved rate capability may be realized by manufacturing the unit cells 110 and 110' having the 3D structure by the first active material layer 121 having a high aspect ratio, and stacking the unit cells 110 and 110' such that the first and second collector layers 111 and 112, which have same polarities, face each other.

In addition, by externally exposing the outer side surface of the solid electrolyte film 130 including the insulating material, the exposed outer side surface of the 3D electrode structure may obtain insulation, and accordingly, a short circuit, which occurs when the second active material layer 122 contacts the first collector layer 111 or the first lead wire 111a, may be prevented. Also, by providing the second collector layer 112 to have a size equal to or smaller than that of the 3D electrode structure, the second collector layer 112 is not exposed outside of the secondary battery 100, and thus the second collector layer 112 may be prevented from contacting the first collector layer 111 or the first lead wire 111a. Also, by providing the first insulating member 151 at the portion of the first lead wire 111a, which is connected to the first collector layer 111, and the second insulating member 152 at the portion of the second collector layer 112, which is connected to the second lead wire 112a, short circuits of the first and second lead wires 111a and 112a due to contact with elements of different polarities may be prevented. As such, the lifetime of the high-capacity secondary battery 100 that has obtained insulation at an outer side may be increased and thus may be used in a mobile device or a wearable device for a long time.

In the above description, the first and second collector layers 111 and 112 are respectively positive and negative electrode collectors, and the first and second active material layers 121 and 122 are respectively positive and negative electrode active material layers, for example. However, the inventive feature is not limited thereto, and the first and second collector layers 111 and 112 may be respectively negative and positive electrode collectors, and the first and second active material layers 121 and 122 may be respectively negative and positive electrode active material layers.

Hereinabove, three technical features of the secondary battery 100 for obtaining insulation outside the secondary battery 100, i.e., a feature in which the outer side of the 3D electrode structure has insulation, a feature in which the second collector layer 112 is not exposed outside the 3D electrode structure, and a feature in which the first and second insulating members 151 and 152 are provided at the first and second lead wires 111a and 112a, have been described. The insulation outside the secondary battery 100 may be obtained even when at least one of the three technical features is realized. However, in the current embodiment, the three technical features are all realized so as to further increase insulation outside the secondary battery 100.

Figure 5:
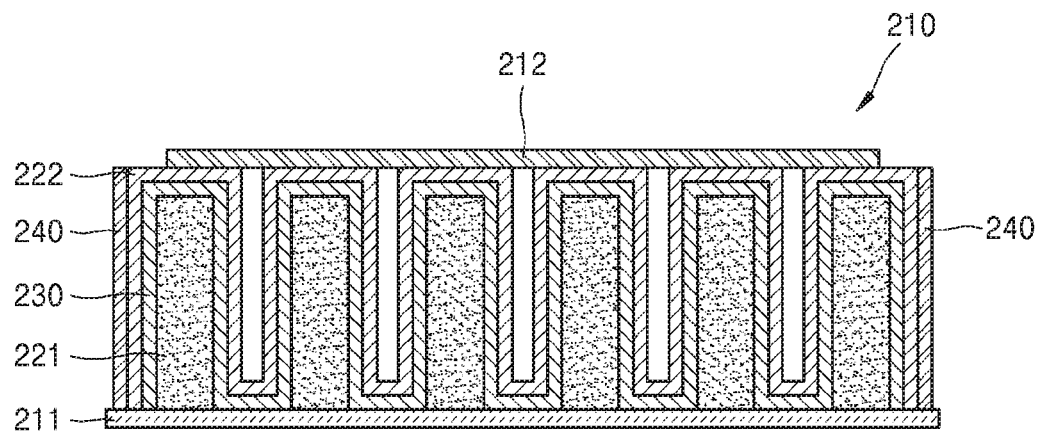
FIG. 5 is a view of another embodiment of a unit cell of a secondary battery.

FIG. 5 is a view of a unit cell 210 of a secondary battery, according to another embodiment.

Referring to FIG. 5, the unit cell 210 of the secondary battery may include a first collector layer 211, a 3D electrode structure provided on the first collector layer 211, and a second collector layer 212 provided on the 3D electrode structure.

In an embodiment, the first collector layer 211 may include a collector material, such as Al or Ni, but is not limited thereto. The 3D electrode structure may include a plurality of first active material layers 221 extending perpendicularly on a top surface of the first collector layer 211 and arranged parallel to an extension direction of the of the first collector layer 211, a solid electrolyte film 230 provided on the first active material layers 221, and a second active material layer 222 provided on the solid electrolyte film 230. Here, each of the first active material layers 221 may include a 3D structure having a high aspect ratio. Such a first active material layer 221 may include, for example, $LiMO_2$, wherein M is Co, Ni, Mn, or a combination of at least two thereof, but is not limited thereto.

The solid electrolyte film 230 may be provided to cover a surface of the plurality of first active material layers 221. Also, the solid electrolyte film 230 may be provided to cover a top surface of the first collector layer 211 between the first active material layers 221. In an embodiment, the solid electrolyte film 230 may include Li, but is not limited thereto.

An insulating layer 240 may be provided on an outer side surface of the second active material layer 222. In an embodiment, the insulating layer 240 may include LiPON or LiSiPON, but is not limited thereto. As such, by providing the insulating layer 240 on the outer side surface of the second active material layer 222, an outer side surface of the 3D electrode structure may have insulation. Also, the second collector layer 212 may be provided on a top surface of the second active material layer 222. Such a second collector layer 212 may be provided by adhering a metal foil to the top surface of the second active material layer 222.

The first collector layer 211 may have a size equal to or larger than that of the 3D electrode structure. When the first collector layer 211 has a size larger than that of the 3D electrode structure, the first collector layer 211 may protrude further than the 3D electrode structure. Also, the second collector layer 212 may have a size equal to or smaller than that of the 3D electrode structure. When the second collector layer 212 has a size smaller than that of the 3D electrode structure, the second collector layer 212 may be provided at an inner side of the 3D electrode structure.

Although not shown in FIG. 5, a first lead wire may extend from the first collector layer 211, and a second lead wire may extend from the second collector layer 212. Here, a first insulating member may be provided at a portion of the first lead wire, which is connected to the first collector layer 211, and a second insulating member may be provided at a portion of the second lead wire, which is connected to the second collector layer 212.

A plurality of the unit cells 210 may be stacked on each other perpendicularly to prepare a high-capacity secondary battery. Here, the adjacent unit cells 210 may be stacked on each other such that the first and second collector layers 211 and 212 having the same polarities may be stacked to face each other. Accordingly, in the adjacent unit cells 210, the first collector layers 211 face and contact each other, and the second collector layers 212 face and contact each other.

In the current embodiment, the unit cells 210 having the 3D structure may be manufactured as in the above-described embodiments, and may be stacked on each other such that the first and second collector layers 211 and 212 having the same polarities face each other, thereby realizing a high-capacity secondary battery having improved energy density and rate capability. Also, by forming the insulating layer 240 on the outer side surface of the 3D electrode structure, not exposing the second collector layer 212 to the outside of the secondary battery, and preparing the first and second insulating members at the first and second lead wires, a short circuit of the secondary battery may be prevented.

Figure 6:
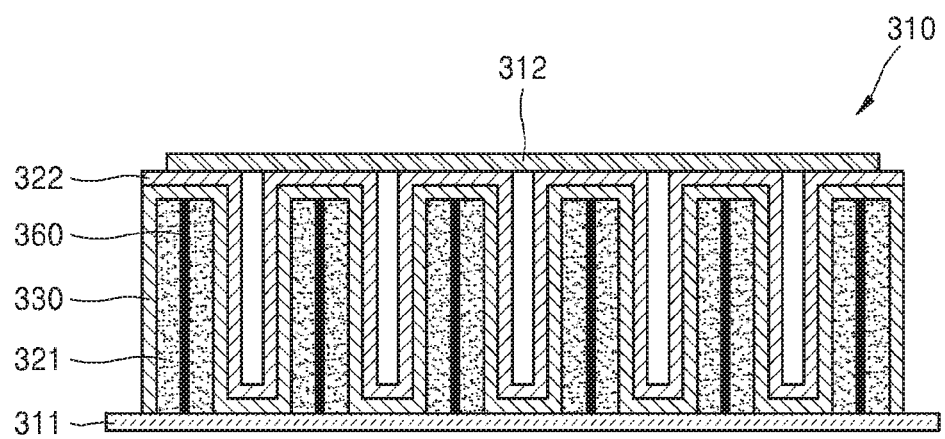
FIG. 6 is a view of another embodiment of a unit cell of a secondary battery.

FIG. 6 is a view of a unit cell 310 of a secondary battery, according to another embodiment.

Referring to FIG. 6, the unit cell 310 of the secondary battery may include a first collector layer 311, a 3D electrode structure provided on the first collector layer 311, and a second collector layer 312 provided on the 3D electrode structure.

The 3D electrode structure may include a plurality of first active material layers 321 extending perpendicularly on a top surface of the first collector layer 311, a solid electrolyte film 330 provided on the first active material layers 321, and a second active material layer 322 provided on the solid electrolyte film 330. The first active material layer 321 may include a 3D structure having a high aspect ratio. An internal collector layer 360 may be provided inside the first active material layer 321, and the internal collector layer 360 may be electrically connected to the first collector layer 311. The internal collector layer 360 may include the same material as that of the first collector layer 311, but is not limited thereto.

The solid electrolyte film 330 may be provided to cover a surface of the plurality of first active material layers 321. The solid electrolyte film 330 may include an insulating material, such as LiPON or LiSiPON. The second active material layer 322 may be provided to cover a surface of the solid electrolyte film 330, except for an outer side surface of the solid electrolyte film 330.

The outer side surface of the solid electrolyte film 330 may be externally exposed by the second active material layer 322. Accordingly, since the outer side surface of the solid electrolyte film 330 including an insulating material is externally exposed, an outer side surface of the 3D electrode structure may obtain insulation. The second collector layer 312 may be provided on a top surface of the second active material layer 322.

The first collector layer 311 may have a size equal to or larger than that of the 3D electrode structure. When the first collector layer 311 has a size larger than that of the 3D electrode structure, the first collector layer 311 may protrude further than the 3D electrode structure. Also, the second collector layer 312 may have a size equal to or smaller than that of the 3D electrode structure. When the second collector layer 312 has a size smaller than that of the 3D electrode structure, the second collector layer 312 may be provided at an inner side of the 3D electrode structure.

Although not shown in FIG. 6, a first lead wire may extend from the first collector layer 311, and a second lead wire may extend from the second collector layer 312. Here, a first insulating member may be provided at a portion of the first lead wire, which is connected to the first collector layer 311, and a second insulating member may be provided at a portion of the second lead wire, which is connected to the second collector layer 312.

A plurality of the unit cells 310 may be stacked on each other perpendicularly to prepare a high-capacity secondary battery. Here, the adjacent unit cells 310 may be stacked on each other such that the first and second collector layers 311 and 312 having the same polarities may be stacked to face each other. Accordingly, in the adjacent unit cells 310, the first collector layers 311 face and contact each other, and the second collector layers 312 face and contact each other.

Hereinabove, the outer surface of the 3D electrode structure obtains insulation by externally exposing the outer side surface of the solid electrolyte film 330. However, the outer side surface of the 3D electrode structure may obtain insulation by forming the second active material layer 322 to cover an entire surface of the solid electrolyte film 330 and preparing an insulating layer (not shown) over an outer surface of the second active material layer 322.

Like the above-described embodiments, the secondary battery according to the current embodiment may have high capacity, improved energy density, and improved rate capability, and may obtain insulation to prevent a short circuit.

Figure 7:
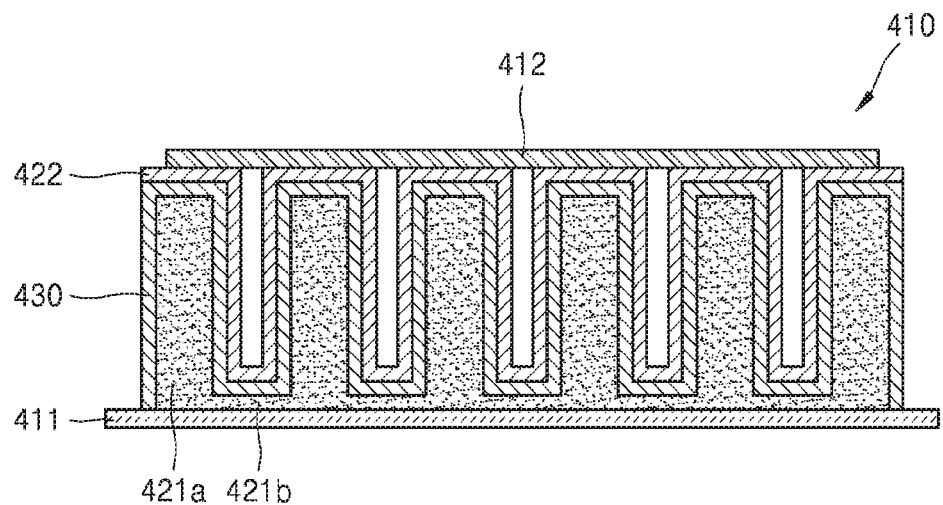
FIG. 7 is a view of another embodiment of a unit cell of a secondary battery.

FIG. 7 is a view of a unit cell 410 of a secondary battery, according to another embodiment.

Referring to FIG. 7, the unit cell 410 of the secondary battery may include a first collector layer 411, a 3D electrode structure provided on the first collect layer 411, and a second collector layer 412 provided on the 3D electrode structure.

The 3D electrode structure may include a plurality of first active material layers 421a, a first bottom active material layer 421b, a solid electrolyte film 430, and a second active material layer 422. The first active material layers 421a may be provided perpendicularly on a top surface of the first collector layer 411, and the first bottom active material layer 421b may be provided at the top surface of the first collector layer 411 to connect the first active material layers 421a. Here, the first active material layer 421a may include a 3D structure having a high aspect ratio. The first bottom active material layer 421b may include the same material as that of the first active material layer 421a, but is not limited thereto.

The solid electrolyte film 430 may be provided to cover surfaces of the first active material layer 421a and the first bottom active material layer 421b. In an embodiment, the solid electrolyte film 430 may include an insulating material, such as LiPON or LiSiPON.

The second active material layer 422 may be provided to cover a surface of the solid electrolyte film 430 except for an outer side surface of the solid electrolyte film 430. The outer side surface of the solid electrolyte film 430 may be externally exposed by the second active material layer 422. Accordingly, since the outer side surface of the solid electrolyte film 430 including an insulating material is externally exposed, an outer side surface of the 3D electrode structure, which is externally exposed, may obtain insulation. Also, the second collector layer 412 may be provided on a top surface of the second active material layer 422.

The first collector layer 411 may have a size equal to or larger than that of the 3D electrode structure. When the first collector layer 411 has a size larger than that of the 3D electrode structure, the first collector layer 411 may protrude further than the 3D electrode structure. Also, the second collector layer 412 may have a size equal to or smaller than that of the 3D electrode structure. When the second collector layer 412 has a size smaller than that of the 3D electrode structure, the second collector layer 412 may be provided at an inner side of the 3D electrode structure.

Although not shown in FIG. 7, a first lead wire may extend from the first collector layer 411, and a second lead wire may extend from the second collector layer 412. Here, a first insulating member may be provided at a portion of the first lead wire, which is connected to the first collector layer 411, and a second insulating member may be provided at a portion of the second lead wire, which is connected to the second collector layer 412.

A plurality of the unit cells 410 may be stacked on each other perpendicularly to prepare a high-capacity secondary battery. Here, the adjacent unit cells 410 may be stacked on each other such that the first and second collector layers 411 and 412 having the same polarities may be stacked to face each other. Accordingly, in the adjacent unit cells 410, the first collector layers 411 face and contact each other, and the second collector layers 412 face and contact each other.

Hereinabove, the outer side surface of the 3D electrode structure obtains insulation by externally exposing the outer side surface of the solid electrolyte film 430. However, the outer side surface of the 3D electrode structure may obtain insulation by forming the second active material layer 422 to cover an entire surface of the solid electrolyte film 430 and preparing an insulating layer (not shown) on an outer side surface of the second active material layer 422.

The secondary battery according to the current embodiment may have high capacity, improved energy density, and improved rate capability, and may obtain insulation to prevent a short circuit.

Figure 8:
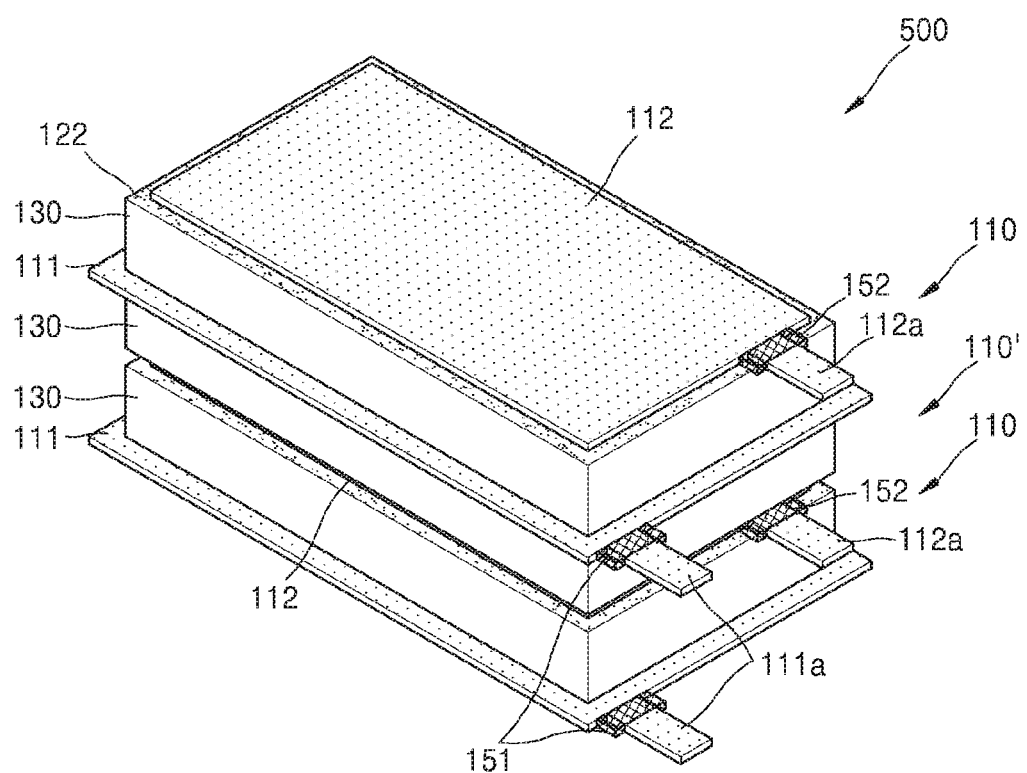
FIG. 8 is a perspective view of another embodiment of a secondary battery.

FIG. 8 is a perspective view of a secondary battery 500 according to another embodiment. The secondary battery 500 of FIG. 8 is the same as the secondary battery 100 of FIG. 1, except that in the secondary battery 500, the first and second collector layers 111 and 112 having the same polarities are unitary.

Referring to FIG. 8, between the unit cells 110 and 110' that are adjacently stacked on each other, the first collector layers 111 are unitary or the second collector layers 112 are unitary. Accordingly, the unit cells 110 and 110' that are adjacently stacked on each other may share one first collector layer 111 or one second collector layer 112.

Figure 9:
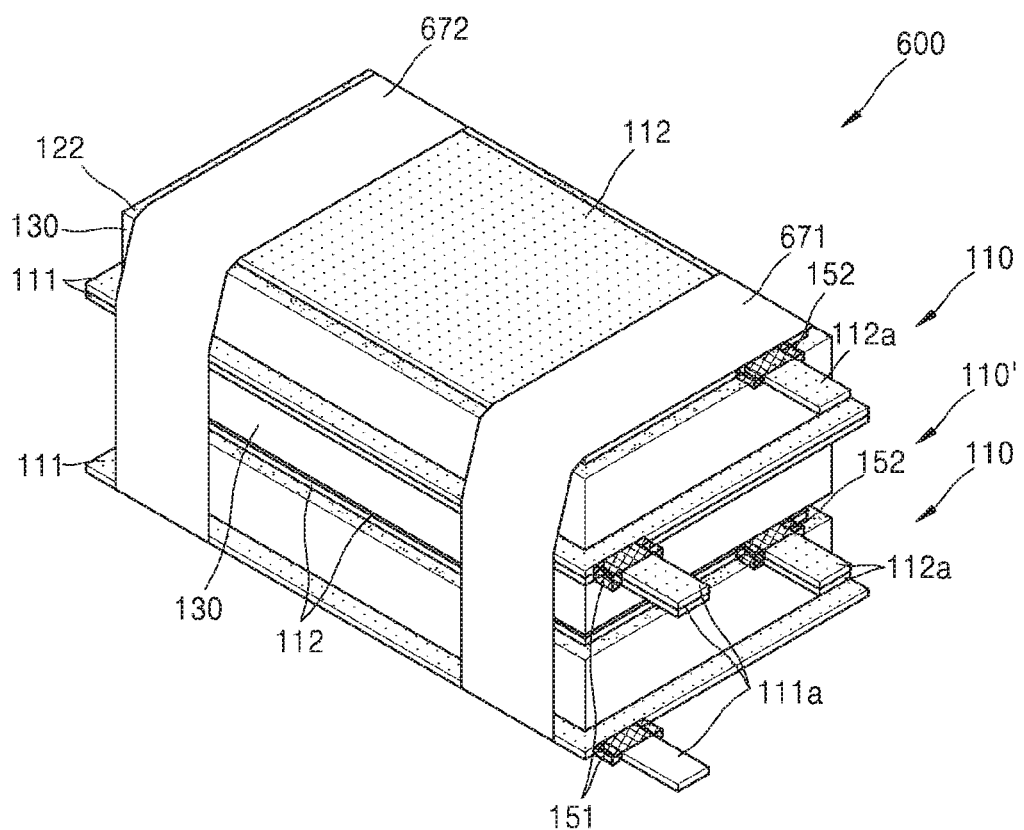
FIG. 9 is a perspective view of another embodiment of a secondary battery.

FIG. 9 is a perspective view of a secondary battery 600 according to another embodiment. The secondary battery 600 shown in FIG. 9 is the same as the secondary battery 100 of FIG. 1, except that the secondary battery 600 includes first and second binding members 671 and 672 that wind around the unit cells 110 and 110' and thus fix the unit cells 110 and 110'.

Referring to FIG. 9, the first binding member 671 may fix the unit cells 110 and 110' by winding one side of the unit cells 110 and 110' that are perpendicularly stacked on each other, and the second binding member 672 may fix the unit cells 110 and 110' by winding the other side of the unit cells 110 and 110'. Here, the first and second binding members 671 and 672 may be, for example, a thermal contraction type film or an adhesive polymer film, but are not limited thereto. In an embodiment, the first and second binding members 671 and 672 may have a thickness of about 20 μm, for example, but are not limited thereto. As such, when the unit cells 110 and 110' are wound and fixed by the first and second binding members 671 and 672, the unit cells 110 and 110' may be aligned and maintain a fixed state. In FIG. 9, two binding members fix unit cells, but the number of binding members may vary.

FIGS. 10A through 16 are views for describing a method of manufacturing a secondary battery, according to an embodiment.

Figure 10A:
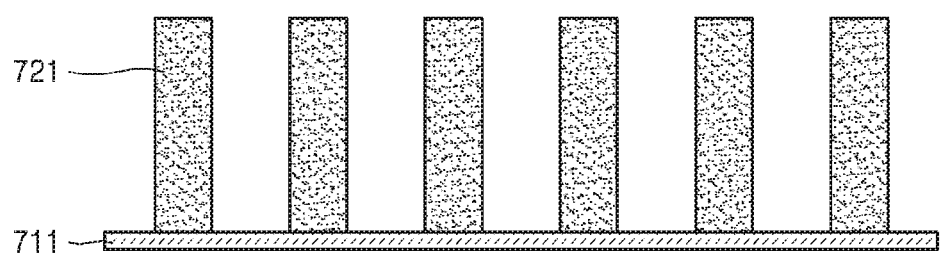
FIGS. 10A through 16 are views for describing an embodiment of a method of manufacturing a secondary battery.
Figure 10B:
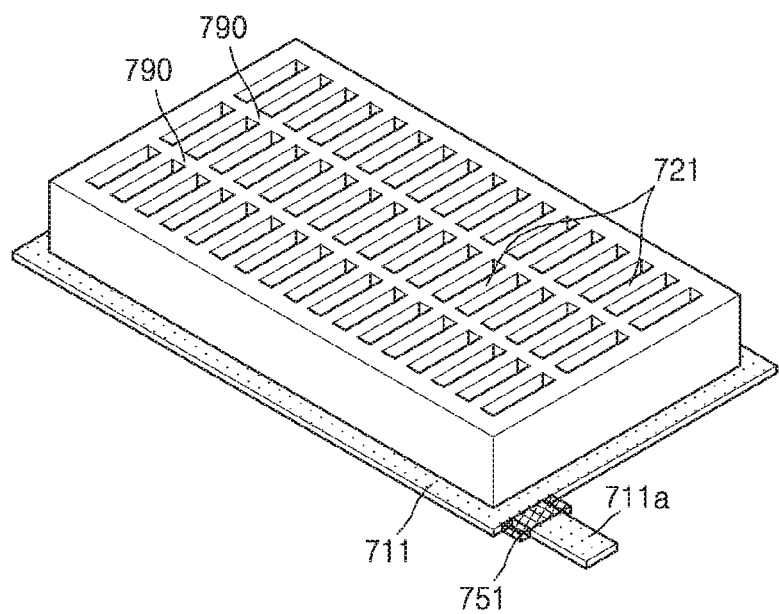

FIGS. 10A and 10B are respectively a cross-sectional view and a perspective view of a plurality of first active material layers 721 adhered to a first collector layer 711.

Referring to FIGS. 10A and 10B, the plurality of first active material layers 721 are adhered to a top surface of the first collector layer 711 by a conductive adhesive (not shown). In an embodiment, the first collector layer 711 may be, for example, a positive electrode collector layer. In an embodiment, the first collector layer 711 may include a collector material, such as Al or Ni, but is not limited thereto.

The first active material layers 721 for a 3D electrode structure described below, and may have a 3D structure having a high aspect ratio. In an embodiment, each of the first active material layers 721 may have an aspect ratio of at least 1:1, but is not limited thereto. The first active material layer 721 may be, for example, a positive electrode active material layer. In an embodiment, the first active material layer 721 may include, for example, LiMO2, wherein M is Co, Ni, Mn, or a combination of at least two thereof, but is not limited thereto.

The first collector layer 711 may have a size equal to or larger than that of the 3D electrode structure. In this regard, the first collector layer 711 may have a size equal to or larger than that of the first active material layer 721. In FIGS. 10A and 10B, the first collector layer 711 has a size larger than that of the first active material layer 721.

As shown in FIG. 10B, a first lead wire 711a extends from the first collector layer 711. A first insulating member 751 may be provided at a portion of the first lead wire 711a, which is connected to the first collector layer 711. In an embodiment, the first insulating member 751 may be a length of about 1 mm to about 1 cm along a length direction of the first lead wire 711a, for example. In an embodiment, the first insulating member 751 may have a length of about 1 mm to about 4 mm along a length direction of the first lead wire 711a, for example, but is not limited thereto. In an embodiment, the first insulating member 751 may be, for example, a deposition film or adhesive tape, but is not limited thereto.

A plurality of barrier layers 790 may be further provided between the first active material layers 721 at regular intervals. Here, the barrier layers 790 may support the first active material layers 721 such that the first active material layers 721 having a high aspect ratio are arranged at regular intervals without deformation. As such, when the first active material layers 721 are arranged at regular intervals, a solid electrolyte film 730 (refer to FIG. 12B) and a second active material layer 722 (refer to FIG. 12B) described later may also be uniformly provided, and the capacity and durability of the secondary battery may increase according to equalization of electrochemical reactions and stability of a structure. Also, the barrier layers 790 are provided perpendicular to the first active material layers 721 to support the first active material layers 721, thereby suppressing deformation of the secondary battery due to expansion or contraction of the first active material layers 721 in a thickness direction thereof when the secondary battery is driven, and thus, the durability of the secondary battery may be increased. Also, the barrier layers 790 may include the same material as that of the first active material layers 721, and thus, active material volume fraction may increase, and accordingly, the energy density of the secondary battery may improve.

As described above, an internal collector (not shown) may be provided in the first active material layer 721, or a first bottom active material layer (not shown) connecting the first active material layers 721 may be provided on a top surface of the first collector layer 711.

Figure 11A:
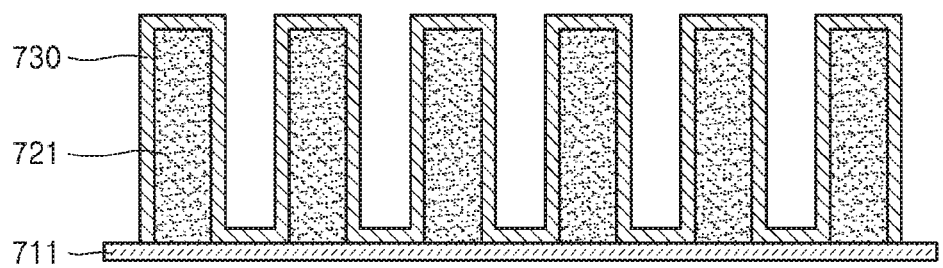
Figure 11B:
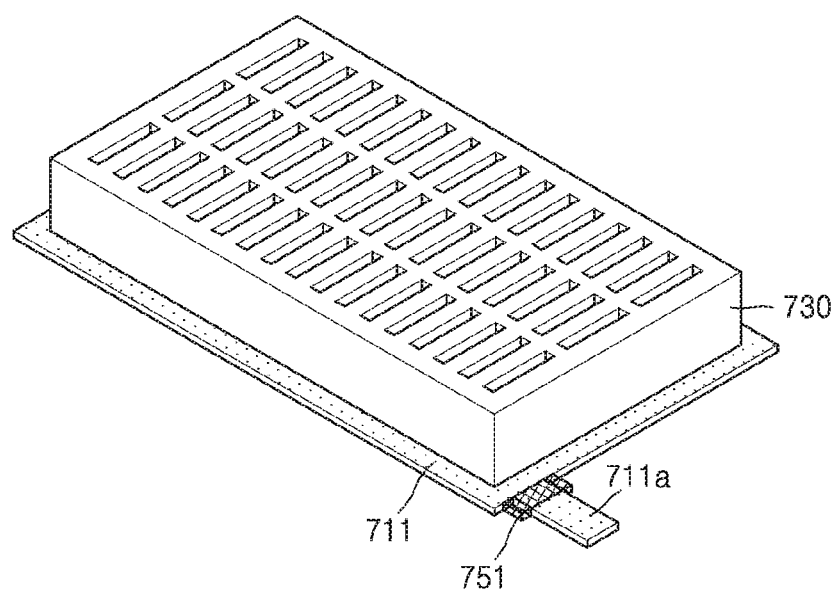

FIGS. 11A and 11B are respectively a cross-sectional view and a perspective view of the solid electrolyte film 730 disposed on the plurality of first active material layers 721.

Referring to FIGS. 11A and 11B, the solid electrolyte film 730 is provided to cover a surface of the first active material layers 721. In an embodiment, the solid electrolyte film 730 may include an insulating material, for example, a Li-based insulating material. In an embodiment, the solid electrolyte film 730 may include LiPON or LiSiPON, for example, but is not limited thereto. In an embodiment, the solid electrolyte film 730 may be provided by depositing the L-based insulating material on the surface of the first active material layers 721 via chemical vapor deposition ("CVD") or plasma enhanced chemical vapor deposition ("PECVD"), for example.

Figure 12A:
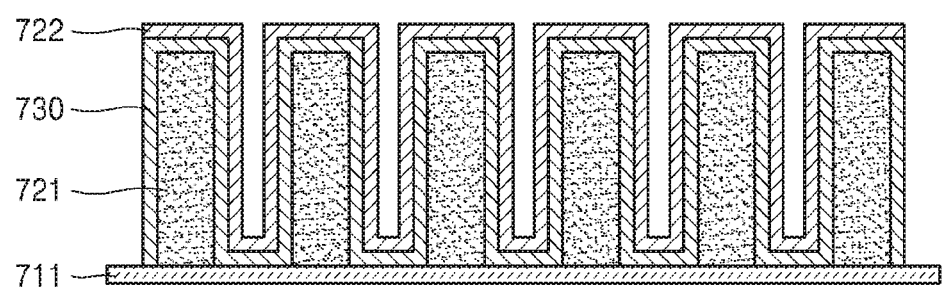
Figure 12B:
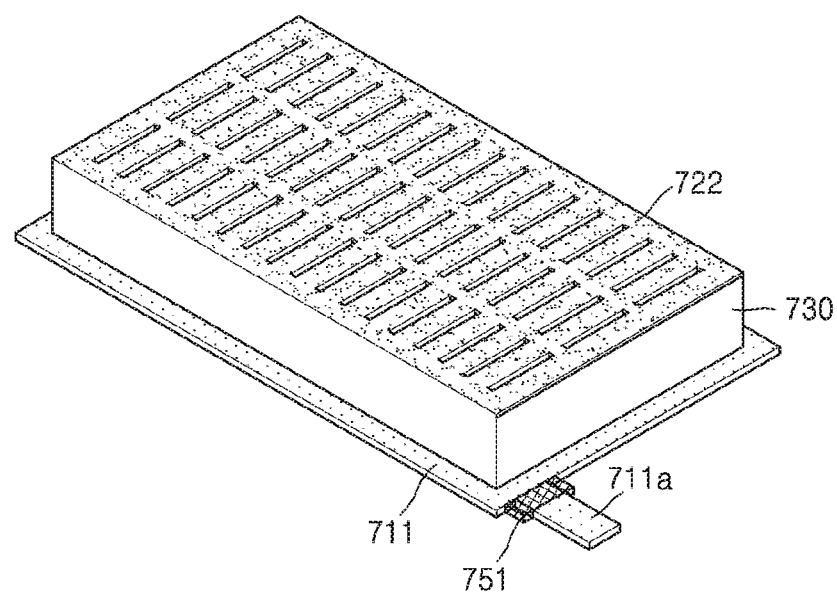

FIGS. 12A and 12B are respectively a cross-sectional view and a perspective view of the second active material layer 722 disposed on the solid electrolyte film 730.

Referring to FIGS. 12A and 12B, the second active material layer 722 is provided to cover a surface of the solid electrolyte film 730, except an outer side surface of the solid electrolyte film 730. In an embodiment, the second active material layer 722 may be provided by depositing Li on the surface of the solid electrolyte film 730 via CVD or evaporation, for example. Here, the second active material layer 722 may be disposed on the surface of the solid electrolyte film 730 excluding the outer side surface of the solid electrolyte film 730 by a mask (not shown). Accordingly, the outer side surface of the solid electrolyte film 730 including an insulating material may be externally exposed.

As such, the plurality of first active material layers 721 perpendicularly provided on the top surface of the first collector layer 711, the solid electrolyte film 730 disposed on the surface of the first active material layer 721, and the second active material layer 722 disposed on the surface of the solid electrolyte film 730 may form a 3D electrode structure.

Figure 13A:
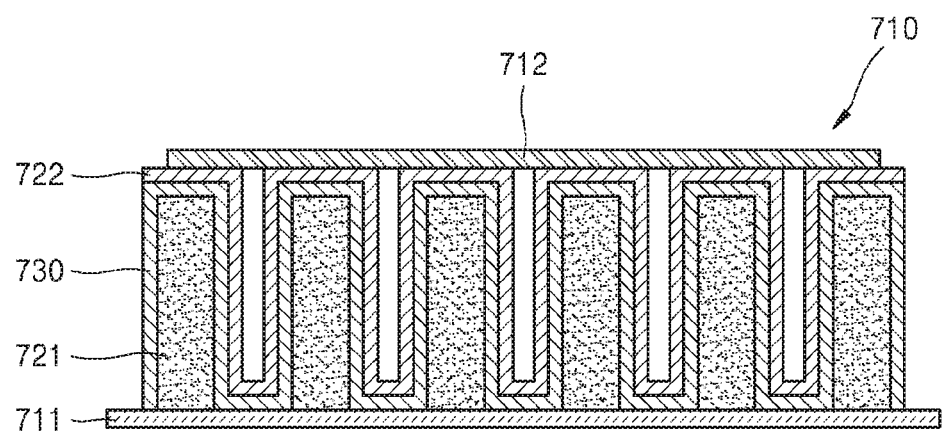
Figure 13B:
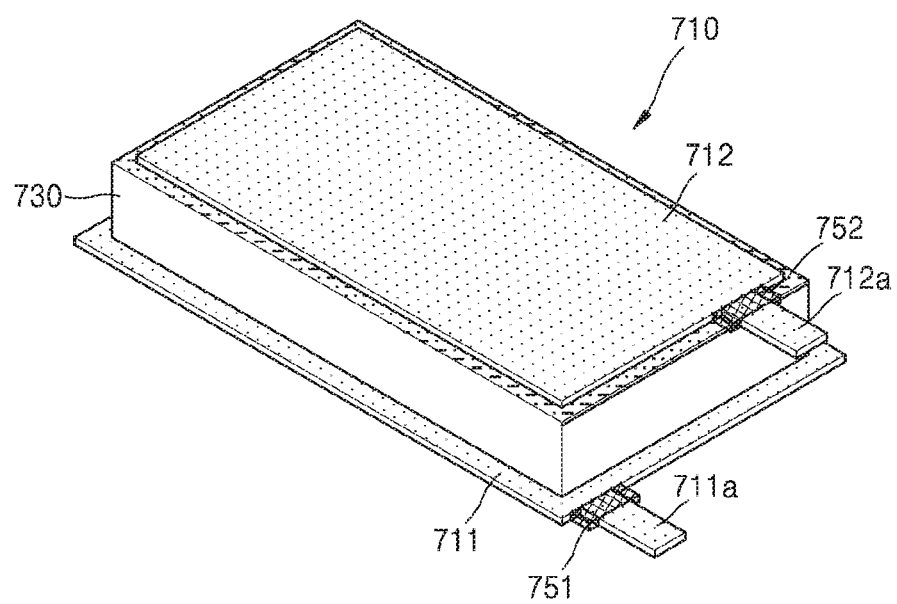

FIGS. 13A and 13B are respectively a cross-sectional view and a perspective view of a second collector layer 712 disposed on a top surface of the second active material layer 722.

Referring to FIGS. 13A and 13B, the second collector layer 712 is disposed on the top surface of the second active material layer 722. The second collector layer 712 may be, for example, a negative electrode collector layer. In an embodiment, the second collector layer 712 may include, for example, Cu, but is not limited thereto. The second collector layer 712 may be provided by adhering a metal foil to the top surface of the second active material layer 722. In an embodiment, the metal foil may have a thickness of about 3 µm to about 10 µm, for example, but is not limited thereto.

The second collector layer 712 may have a size equal to or smaller than that of the 3D electrode structure. In FIGS. 13A and 13B, the second collector layer 712 has a size smaller than that of the 3D electrode structure. In this case, the second collector layer 712 may be provided at an inner side of the 3D electrode structure. In an embodiment, a size difference between the second collector layer 712 and the 3D electrode structure may be about 10 µm or less, for example, but is not limited thereto.

As described above, when the first collector layer 711 has a size larger than that of the 3D electrode structure, the first collector layer 711 may protrude further than the 3D electrode structure. In an embodiment, a protruding size of the first collector layer 711 may be from about 500 µm to about 3 mm, for example, but is not limited thereto.

As shown in FIG. 13B, a second lead wire 712a extends from the second collector layer 712. A second insulating member 752 may be provided at a portion of the second lead wire 712a, which is connected to the second collector layer 712. Here, the second insulating member 752 may have a length of about 1 mm to about 1 cm along a length direction of the second lead wire 712a. In an embodiment, the second insulating member 752 may have a length of about 1 mm to about 4 mm along the length direction of the second lead wire 712a, but is not limited thereto. The second insulating member 752 may be, for example, a deposition film or adhesive tape, but is not limited thereto. As such, a unit cell 710 of the secondary battery may be prepared by forming the second collector layer 712 on a top surface of the second active material layer 722.

Figure 14:
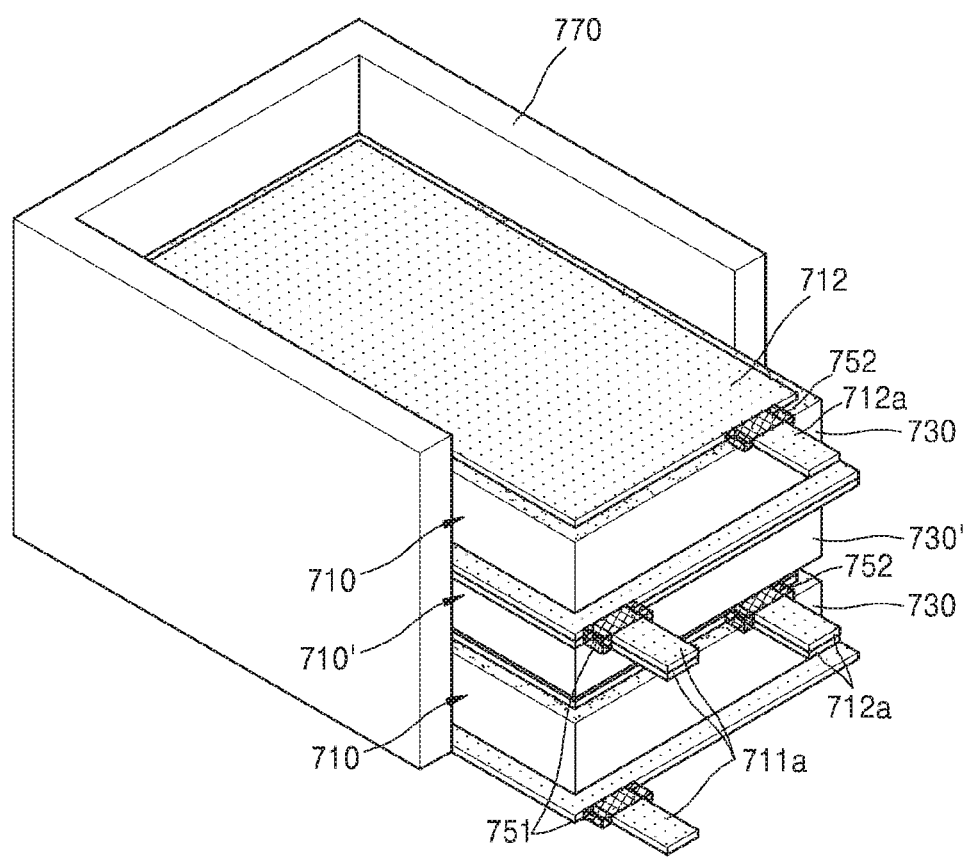

FIG. 14 is a perspective view of a plurality of unit cells 710 and 710' stacked on each other in an alignment jig 770.

Referring to FIG. 14, a plurality of the unit cell 710 described above may be manufactured, and the unit cells 710 and 710' may be aligned by sequentially arranging the unit cells 710 and 710' in the alignment jig 770.

The adjacent unit cells 710 and 710' may be symmetrically stacked on each other. In other words, the adjacent unit cells 710 and 710' may be stacked on each other such that the first and second collector layers 711 and 712 having the same polarities may be stacked to face each other. In FIG. 14, the unit cell 710' is obtained by turning over the unit cell 710. Accordingly, in the adjacent unit cells 710 and 710' that are stacked on each other, the first collector layers 711 face and contact each other, and the second collector layers 712 face and contact each other.

Figure 15:
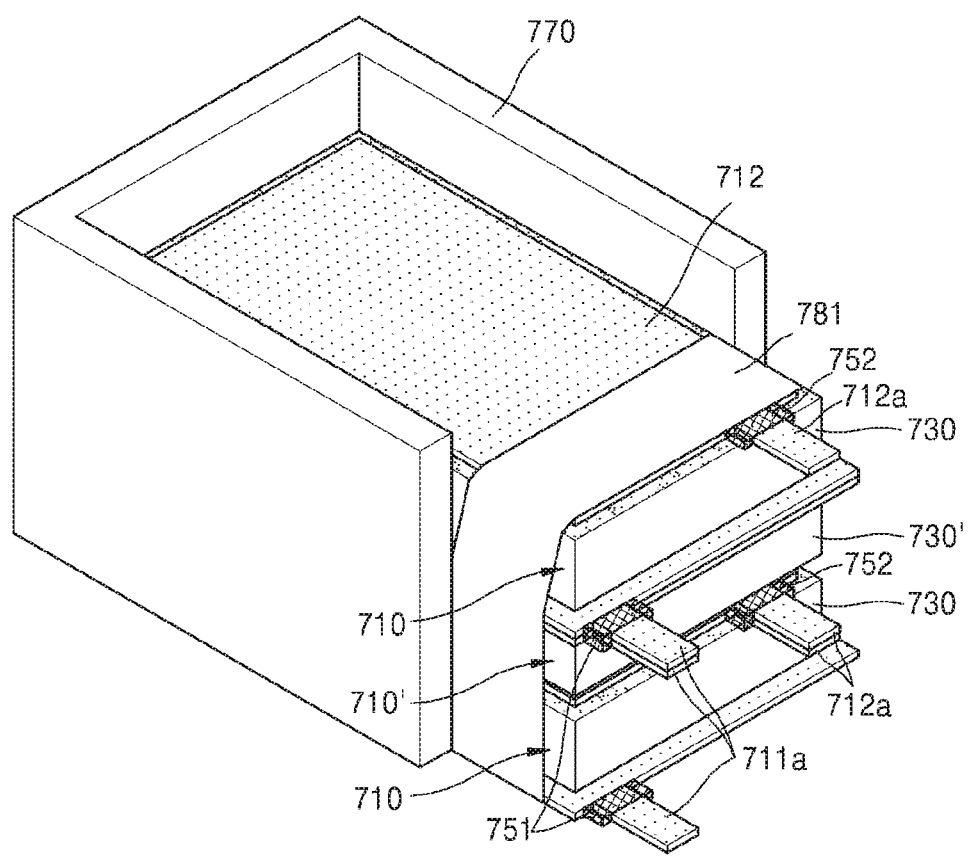

FIG. 15 is a perspective view of the unit cells 710 and 710' aligned in the alignment jig 770, wherein one side of the unit cells 710 and 710' are fixed by being wound by a first binding member 781.

Referring to FIG. 15, the unit cells 710 and 710' are stacked and aligned in the alignment jig 770, and then the one side of the unit cells 710 and 710' are fixed by being wound by the first binding member 781. Here, the first binding member 781 may be a thermal contraction type film or an adhesive polymer film, but is not limited thereto. In an embodiment, the first binding member 781 may have a thickness of about 20 µm, for example, but is not limited thereto.

Figure 16:
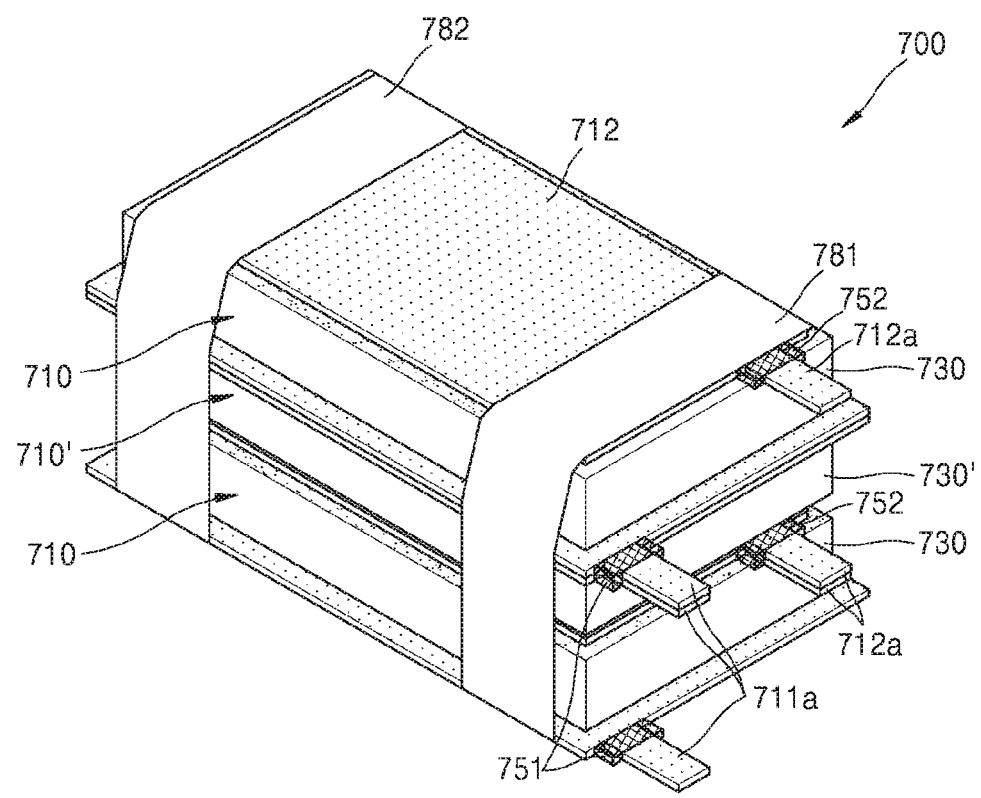

FIG. 16 is a perspective view of the other side of the aligned unit cells 710 and 710' fixed by being wound by a second binding member 782.

Referring to FIG. 16, the alignment jig 770 may be removed while the one side of the stacked unit cells 710 and 710' is fixed by the first binding member 781, and then the other side of the unit cells 710 and 710' may be wound and fixed by the second binding member 781. Here, like the first binding member 781, the second binding member 782 may be a thermal contraction type film or an adhesive polymer film, but is not limited thereto.

As such, when the stacked unit cells 710 and 710' are wound and fixed by the first and second binding members 781 and 782, the unit cells 710 and 710' are aligned and maintain a fixed state. In FIG. 16, two binding members, i.e., the first and second binding members 781 and 782, fix the unit cells 710 and 710', but the number of binding members may vary. As described above, a secondary battery 700 may be completed by winding and fixing the unit cells 710 and 710' by the first and second binding members 781 and 782.

As described above, the unit cells 710 and 710' having a 3D structure are manufactured by the first active material layer 721 having a high aspect ratio, and are stacked such that the first and second collector layers 711 and 712 having the same polarities face each other, thereby realizing the high-capacity secondary battery 700 having improved energy density and improved rate capability.

Also, an outer side surface of the secondary battery 700 may obtain insulation by externally exposing an outer side surface of the solid electrolyte film 730 including an insulating material. Also, by not exposing the second collector layer 712 to the outside of the secondary battery 700, the second collector layer 712 may be prevented from contacting the first collector layer 711 or the first lead wire 711a. Also, by further providing the first and second insulating members 751 and 752 to the first and second lead wires 711a and 712a, short circuits of the first and second lead wires 711a and 712a due to contact with a component of a different polarity may be prevented. As such, the high-capacity secondary battery 700 may obtain insulation on the outer surface.

Hereinabove, the first and second collector layers 711 and 712 are respectively positive and negative electrode collector layers, and the first and second active material layers 721 and 722 are respectively positive and negative electrode active material layers. However, an inventive feature is not limited thereto, and the first and second collector layers 711 and 712 may respectively be negative and positive electrode collector layers, and the first and second active material layers 721 and 722 may respectively be negative and positive electrode active material layers.

In the above embodiments, the adjacent unit cells 710 an 710' stacked on each other each include the first and second collector layers 711 and 712, but alternatively, between the unit cells 710 and 710' that are adjacently stacked on each other, the first collector layers 711 may be unitary or the second collector layers 712 may be unitary. Accordingly, the unit cells 110 and 110' that are adjacently stacked on each other may share one first collector layer 711 or one second collector layer 712.

FIGS. 17 through 21 are views for describing a method of manufacturing a secondary battery, according to another embodiment. Hereinafter, difference between the current embodiment and the previous embodiments will be mainly described.

Figure 17:
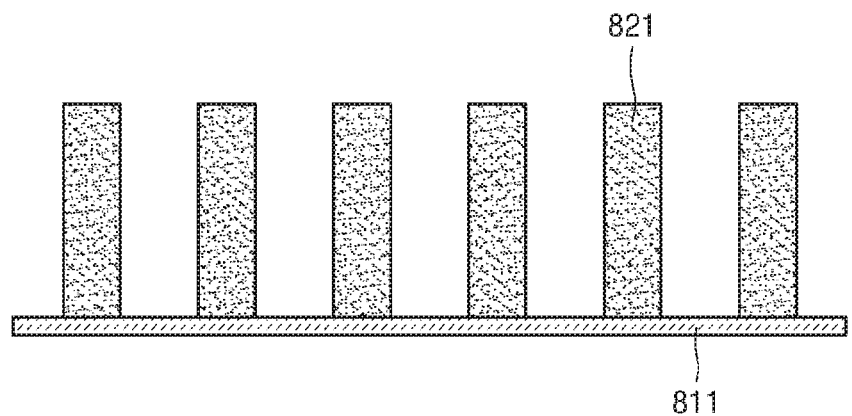
FIGS. 17 through 21 are views for describing another embodiment of a method of manufacturing a secondary battery.

Referring to FIG. 17, a plurality of first active material layers 821 are adhered on a top surface of a first collector layer 811 by a conductive adhesive (not shown). The first active material layers 821 form a 3D electrode structure described below, and may include a 3D structure having a high aspect ratio. The first collector layer 811 may have a size equal to or larger than that of the 3D electrode structure.

A first lead wire (not shown) extends from the first collector layer 811, and a first insulating member (not shown) may be provided at a portion of the first lead wire, which is connected to the first collector layer 811. Also, as described above, an internal collector (not shown) may be further provided in the first active material layer 821, or a first bottom active material layer (not shown) connecting the first active material layers 821 may be further provided on the top surface of the first collector layer 811.

Figure 18:
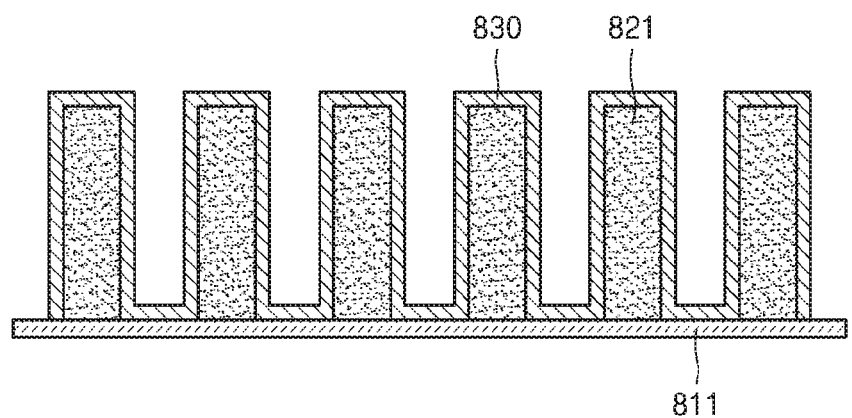

Referring to FIG. 18, a solid electrolyte film 830 is provided to cover a surface of the first active material layers 821. In an embodiment, the solid electrolyte film 830 may include an insulating material, for example, an Li-based insulating material. In an embodiment, the solid electrolyte film 830 may be provided by depositing the Li-based insulating material on the surface of the first active material layer 821, via CVD or PECVD, for example.

Figure 19:
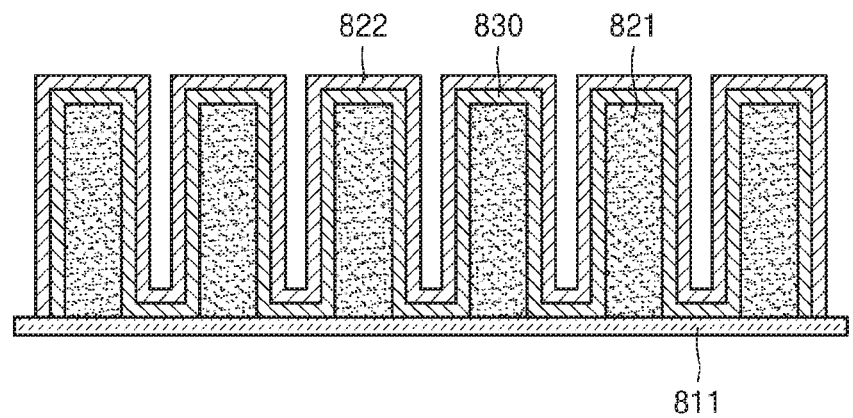

Referring to FIG. 19, a second active material layer 822 is provided throughout the solid electrolyte film 830. The second active material layer 822 may be provided by depositing Li on an entire surface of the solid electrolyte film 830.

Figure 20:
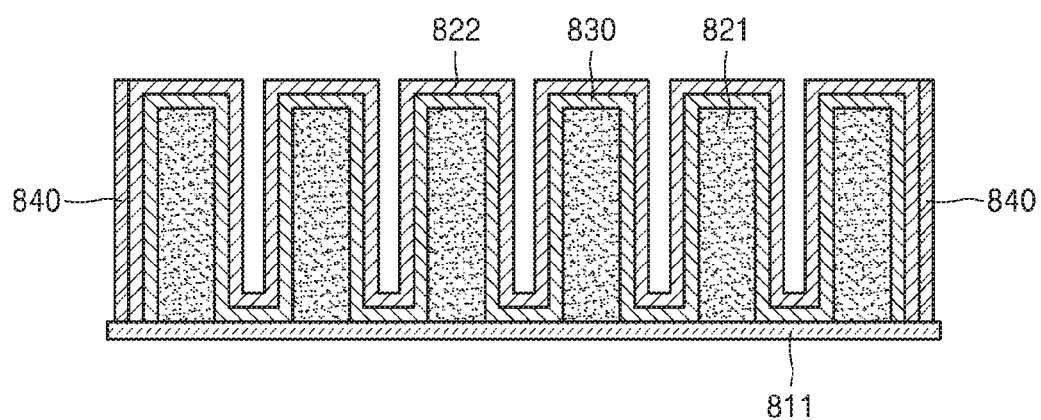

Referring to FIG. 20, an insulating layer 840 is disposed on an outer side surface of the second active material layer 822. The insulating layer 840 may be provided by depositing an insulating material, for example, an Li-based insulating material, on the outer side surface of the second active material layer 822. As such, the first active material layers 821 perpendicularly extend on the top surface of the first collector layer 811, the solid electrolyte film 830 disposed on the surface of the first active material layers 821, the second active material layer 822 disposed on the surface of the solid electrolyte film 830, and the insulating layer 840 disposed on the outer side surface of the second active material layer 822 may form the 3D electrode structure.

Figure 21:
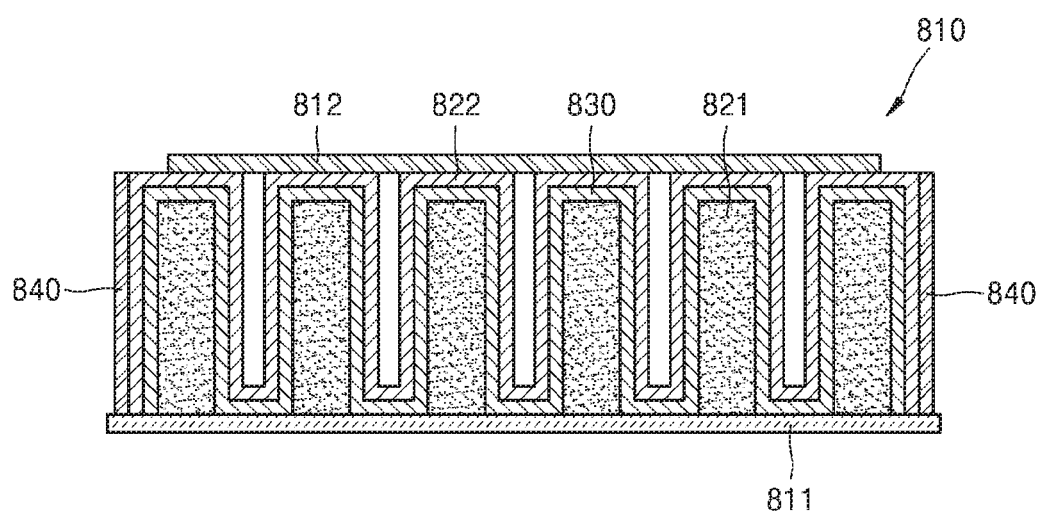

Referring to FIG. 21, a second collector layer 812 is disposed on a top surface of the second active material layer 822. The second collector layer 812 may be provided by adhering a metal foil to the top surface of the second active material layer 822. The second collector layer 812 may have a size equal to or smaller than that of the 3D electrode structure.

A second lead wire (not shown) extends from the second collector layer 812, and a second insulating member (not shown) may be provided at a portion of the second lead wire, which is connected to the second collector layer 812. The second collector layer 812 may be disposed on the top surface of the second active material layer 822, thereby manufacturing a unit cell 810 of the secondary battery.

Also, a plurality of the unit cells 810 may be manufactured and then aligned and stacked in an alignment jig as described above. Then, the aligned and stacked unit cells 810 may be fixed by being wound by a binding member, thereby completing the secondary battery.

According to one or more embodiments, unit cells having a 3D structure are manufactured by an active material having a high aspect ratio, and are stacked on each other such that collectors having the same polarities face each other, thereby realizing a high-capacity secondary battery having improved energy density and improved rate capability.

Insulation of an outer side surface of a 3D electrode structure may be obtained by externally exposing an outer side surface of a solid electrolyte film including an insulating material, and accordingly, a short circuit of a second active material layer due to contact with a first collector layer or a first lead wire may be prevented. Also, a second collector layer may have a size equal to or smaller than that of the 3D electrode structure such as not to be exposed outside the 3D electrode structure, thereby preventing a short circuit of the second collector layer due to contact with the first collector layer or the first lead wire. Also, by providing a first insulating member at the first lead wire connected to the first collector layer and providing a second insulating member at a second lead wire connected to the second collector layer, short circuits of the first and second lead wires may be prevented. As such, a high-capacity secondary battery having insulation on an outer surface may have increased durability, and thus may be used in a mobile device or a wearable device for a long time.

It should be understood that embodiments described herein should be considered in a descriptive sense only and not for purposes of limitation. Descriptions of features within each embodiment should typically be considered as available for other similar features in other embodiments.

While one or more embodiments have been described with reference to the drawing figures, it will be understood by those of ordinary skill in the art that various changes in form and details may be made therein without departing from the spirit and scope as defined by the following claims.

What is claimed is:

1. A secondary battery in which a plurality of unit cells is stacked on each other, wherein each of the plurality of unit cells comprises:
   first and second collector layers, which are spaced apart from each other and extend in first and second directions; and
   a 3-dimensional electrode structure provided between the first and second collector layers in a third direction perpendicular to the first and second directions and including an insulating material such that an outer side surface of the 3-dimensional electrode structure that is externally exposed in the first and second directions is electrically insulated by the insulating material, the 3-dimensional electrode structure comprising:
      a solid electrolyte film including the insulating material and having at least two heights in the third direction,
   wherein, a first collector layer of the first collector layers has a size larger than a maximum size of the 3-dimensional electrode structure in a direction parallel to a main extension direction of a second collector layer of the second collector layers, and
   in the plurality of unit cells, the first collector layers are stacked to face each other and the second collector layers are stacked to face each other.

2. The secondary battery of claim 1, wherein the 3-dimensional electrode structure comprises:
   a plurality of first active material layers extending perpendicularly on the first collector layer of the first collector layers such that the solid electrolyte film is provided on the plurality of first active material layers; and
   a second active material layer provided on the solid electrolyte film and exposing an outer side surface of the solid electrolyte film.

3. The secondary battery of claim 1, wherein the 3-dimensional electrode structure comprises:
   a plurality of first active material layers extending perpendicularly on the first collector layer of the first collector layers such that the solid electrolyte film is provided on the plurality of first active material layers;
   a second active material layer provided on the solid electrolyte film; and
   an insulating layer provided on an outer side surface of the second active material layer.

4. The secondary battery of claim 1, wherein the second collector layer of the second collector layers has a size equal to or smaller than that of the 3-dimensional electrode structure.

5. The secondary battery of claim 1, wherein each of the plurality of unit cells further comprises:
   a first lead wire extending from the first collector layer of the first collector layers; and
   a second lead wire extending from the second collector layer of the second collector layers.

6. The secondary battery of claim 5, wherein a first insulating member is provided at a portion of the first lead wire, which is connected to the first collector layer, and a second insulating member is provided at a portion of the second lead wire, which is connected to the second collector layer.

7. The secondary battery of claim 1, further comprising at least one binding member winding the plurality of unit cells that are stacked on each other to fix and support the plurality of unit cells.

8. The secondary battery of claim 1, wherein the first collector layers of adjacent unit cells of the plurality of unit cells, which face each other, are unitary, and the second collector layers of the adjacent unit cells, which face each other, are unitary.

9. The secondary battery of claim 1, wherein the second collector layer of the second collector layers comprises a metal foil attached to the 3-dimensional electrode structure.

10. A secondary battery in which a plurality of unit cells is stacked on each other, wherein each of the plurality of unit cells comprises:
    first and second collector layers, which are spaced apart from each other; and
    a 3-dimensional electrode structure provided between the first and second collector layers,
    wherein a second collector layer of the second collector layers has a size smaller than that of the 3-dimensional electrode structure in a direction parallel to a main extension direction of the second collector layer,
    wherein a first collector layer of the first collector layers has a size larger than a maximum size of the 3-dimensional electrode structure in the direction parallel to the main extension direction of the second collector layer, and
    in the plurality of unit cells, the first collector layers are stacked to face each other and the second collector layers are stacked to face each other.

11. The secondary battery of claim 10, wherein the 3-dimensional electrode structure is provided such that an outer side surface that is externally exposed is insulated.

12. The secondary battery of claim 11, wherein the 3-dimensional electrode structure comprises:
    a plurality of first active material layers extending perpendicularly on the first collector layer such that a solid electrolyte film is provided on the plurality of first active material layers; and
    a second active material layer provided on the solid electrolyte film and exposing an outer surface of the solid electrolyte film.

13. The secondary battery of claim 11, wherein the 3-dimensional electrode structure comprises:
    a plurality of first active material layers extending perpendicularly on the first collector layer such that a solid electrolyte film is provided on the plurality of first active material layers;
    a second active material layer provided on the solid electrolyte film; and
    an insulating layer provided on a side outer surface of the second active material layer.

14. The secondary battery of claim 10, wherein each of the plurality of unit cells further comprises:
    a first lead wire extending from the first collector layer of the first collector layers; and
    a second lead wire extending from the second collector layer.

15. The secondary battery of claim 14, wherein a first insulating member is provided at a portion of the first lead wire, which is connected to the first collector layer, and a second insulating member is provided at a portion of the second lead wire, which is connected to the second collector layer.

16. The secondary battery of claim 10, further comprising at least one binding member winding around the plurality of unit cells that are stacked on each other to fix and support the plurality of unit cells.

17. The secondary battery of claim 10, wherein the first collector layers of adjacent unit cells the plurality of unit cells, which face each other, are unitary, and the second collector layers of the adjacent unit cells, which face each other, are unitary.

18. The secondary battery of claim 10, wherein the second collector layer comprises a metal foil attached to the 3-dimensional electrode structure.

19. A unit cell of a secondary battery, the unit cell comprising:
 first and second collector layers, which are spaced apart from each other and extend in first and second directions; and
 a 3-dimensional electrode structure provided between the first and second collector layers in a third direction perpendicular to the first and second directions and including an insulating material such that an outer side surface of the 3-dimensional electrode structure that is externally exposed in the first and second directions is electrically insulated by the insulating material, the 3-dimensional electrode structure comprising:
  a solid electrolyte film including the insulating material and having at least two heights in the third direction,
 wherein a first collector layer of the first collector layers has a size larger than a maximum size of the 3-dimensional electrode structure in a direction parallel to a main extension direction of a second collector layer of the second collector layers.

20. The unit cell of claim 19, wherein the 3-dimensional electrode structure comprises:
 a plurality of first active material layers extending perpendicularly on the first collector layer of the first collector layers such that the solid electrolyte film is provided on the plurality of first active material layers; and
 a second active material layer provided on the solid electrolyte film and exposing an outer side surface of the solid electrolyte film.

21. The unit cell of claim 19, wherein the 3-dimensional electrode structure comprises:
 a plurality of first active material layers extending perpendicularly on the first collector layer of the first collector layers such that the solid electrolyte film is provided on the plurality of first active material layers;
 a second active material layer provided on the solid electrolyte film; and
 an insulating layer provided on an outer side surface of the second active material layer.

22. The unit cell of claim 19, wherein the second collector layer of the second collector layers has a size equal to or smaller than that of the 3-dimensional electrode structure.

23. The unit cell of claim 19, further comprising:
 a first lead wire extending from the first collector layer of the first collector layers; and
 a second lead wire extending from the second collector layer of the second collector layers,
 wherein a first insulating member is provided at a portion of the first lead wire, which is connected to the first collector layer, and a second insulating member is provided at a portion of the second lead wire, which is connected to the second collector layer.

* * * * *